United States Patent
Carlson (10) Patent No.: US 7,481,206 B1
(45) Date of Patent: Jan. 27, 2009

(54) ECCENTRIC PULLEY SHAFT

(75) Inventor: Michael A. Carlson, Stanley, KS (US)

(73) Assignee: Accessible Technologies, Inc., Lenexa, KS (US)

( * ) Notice: Subject to any disclaimer, the term of this patent is extended or adjusted under 35 U.S.C. 154(b) by 692 days.

(21) Appl. No.: 10/860,568

(22) Filed: Jun. 1, 2004

(51) Int. Cl.
*F02B 33/00* (2006.01)
*F16H 7/10* (2006.01)
*F16H 7/12* (2006.01)

(52) U.S. Cl. ................................ 123/559.1; 474/112
(58) Field of Classification Search .............. 123/559.1, 123/559.3; 474/112, 111, 903, 199, 133, 474/135; 74/89
See application file for complete search history.

(56) References Cited

U.S. PATENT DOCUMENTS

| | | | | |
|---|---|---|---|---|
| 660,570 | A * | 10/1900 | Green ........................ | 474/135 |
| 1,198,869 | A | 9/1916 | Pierce .......................... | 74/390 |
| 1,345,461 | A | 7/1920 | Rayfield ...................... | 474/112 |
| 2,273,458 | A * | 2/1942 | Anderson ..................... | 415/23 |
| 2,426,960 | A | 9/1947 | Wesselhoff ................. | 474/112 |
| 2,646,690 | A | 7/1953 | Crowther .................... | 474/112 |
| 2,687,650 | A * | 8/1954 | Renaud ....................... | 474/112 |
| 2,909,074 | A | 10/1959 | Scheiterlein ................. | 474/112 |
| 3,358,521 | A * | 12/1967 | Browning, Jr. .............. | 474/133 |
| 3,399,582 | A | 9/1968 | Henry ............................ | 74/89 |
| 3,628,387 | A | 12/1971 | Gaskell et al. ................. | 74/89 |
| 3,950,046 | A * | 4/1976 | Lubbersmeyer ............. | 474/199 |
| 4,215,658 | A * | 8/1980 | Smith et al. .............. | 123/41.44 |
| 4,222,280 | A * | 9/1980 | Stewart ...................... | 474/112 |
| 4,488,447 | A | 12/1984 | Gebhardt ..................... | 474/112 |
| 4,500,303 | A * | 2/1985 | Sermersheim et al. ...... | 474/112 |
| 4,767,383 | A * | 8/1988 | St. John ...................... | 474/111 |
| 4,889,436 | A | 12/1989 | Lynn, Jr. ..................... | 474/112 |
| 5,224,459 | A * | 7/1993 | Middlebrook ............ | 123/559.1 |
| 5,256,112 | A * | 10/1993 | Thomey et al. ............. | 474/112 |
| 5,685,197 | A | 11/1997 | Baker et al. ................... | 74/409 |
| 6,146,111 | A * | 11/2000 | Coleman .................... | 474/112 |
| 6,318,346 | B1 * | 11/2001 | Martin ..................... | 123/559.1 |
| 6,478,469 | B1 | 11/2002 | Jones ....................... | 123/559.1 |
| 7,216,621 | B2 * | 5/2007 | Pigott et al. ................. | 474/903 |
| 2002/0182063 | A1 * | 12/2002 | Edsinger .................. | 123/559.1 |

* cited by examiner

*Primary Examiner*—Thai-Ba Trieu
(74) *Attorney, Agent, or Firm*—Hovey Williams LLP (57) ABSTRACT

An air induction system (10) is disclosed including an improved drive assembly (12) constructed in accordance with the principles of a preferred embodiment of the present invention and configured for transmitting power to a blower (14). The illustrated drive assembly (12) broadly includes bracketry (26) for supporting the other components of the drive assembly (12), a primary drive pulley (22), a transfer drive subassembly (28) for transferring power from the pulley (22) downstream, a supercharger drive subassembly (30) for transferring power from the subassembly (28) to the supercharger (14), and an intermediate eccentric pulley shaft subassembly (32) adjustably inter-communicating the subassemblies (28) and (30). The intermediate eccentric pulley shaft subassembly (32) is adjustable so as to eliminate the need for an idler pulley on at least one of the subassemblies (28,30) and includes a shiftable bearing tube (76), and an intermediate eccentric pulley shaft (78) rotatably supported in the bearing tube (76) by a pair of bearings (80) and (82).

17 Claims, 6 Drawing Sheets

ECCENTRIC PULLEY SHAFT

BACKGROUND OF THE INVENTION

1. Field of the Invention

The present invention relates generally to equipment for adjusting the tension in an endless element, such as a belt, entrained around a set of pulleys. More specifically, the present invention concerns an eccentric pulley shaft for carrying a pulley wherein shifting of the pulley shaft effects the tension in the belt or chain entraining the pulley—such as in a drive system for a centrifugal supercharger—without the need for an undesirable idler pulley.

2. Discussion of Prior Art

It is known in the art to utilize a set of pulleys or gears entrained by an endless element, such as a belt or chain, to transfer power between a drive shaft and a driven shaft. For example, it is known in the automotive industry to power one or more components off of the crankshaft of an engine using one or more belts entraining a set of pulleys. One such component typically powered off of the crankshaft is a blower for providing compressed induction fluid to the intake manifold of an internal combustion engine, such as a centrifugal supercharger.

These prior art drive systems are problematic and subject to several undesirable limitations. For example, all of these drive systems require the use of at least one idler pulley or gear entrained by each belt or chain for adjusting the tension in the belt or chain. An idler pulley or gear is typically a third component entrained by the endless element that is configured in a triangular arrangement with the drive and driven components. To adjust the tension in the belt or chain, the idler component is shifted. Idler pulleys and gears are undesirable, for example, they increase the friction and/or drag on the endless element, they decrease belt life by "backbending" the belt in a triangular configuration, they increase undesirable slippage of the belt with the requisite triangular setup, and they are part and labor intensive. When the drive system is used to power the impeller of a centrifugal compressor these problems are further magnified as the impeller is often accelerated very quickly and rotated at extremely high speeds. Such conditions are particularly prevalent in some superchargers. For example, in some superchargers, the impeller is accelerated in excess of 80,000 rpm in much less than a second. Therefore, any drive system utilized must be capable of withstanding high accelerations and velocities without permitting untoward movement of the impeller relative to the rotational axis. Accordingly, there is a need for an improved drive system that minimizes the need for undesirable idler pulleys or gears.

SUMMARY OF THE INVENTION

The present invention provides an improved drive system that does not suffer from the problems and limitations of the prior art systems detailed above. The inventive drive system includes an eccentric pulley shaft that enables adjustment of the tension in the endless element while minimizing the need for additional, undesirable idler pulleys or gears. The inventive drive system is particularly well suited for the drive belt of a centrifugal supercharger.

A first aspect of the present invention concerns an eccentric pulley shaft assembly that broadly includes a housing assembly, an elongated shaft rotatably supported by the housing assembly and presenting opposed ends and defining a longitudinal central shaft axis extending between the ends, and at least one pulley coupled to one of the ends of the shaft and being operable to receive an endless element for rotation therewith. The housing assembly includes a shiftable bearing tube presenting an outer circumference that generally defines a central tube axis. The central tube axis extends longitudinally through the bearing tube. The bearing tube includes an internal bore configured to rotatably receive at least a portion of the shaft. The internal bore presents an inner circumference that (generally defines a central bore axis extending longitudinally through the internal bore. At least one of the axes is non-coaxial with another of the axes.

A second aspect of the present invention concerns an air induction system for supplying compressed induction fluid to an intake manifold of an internal combustion engine wherein the engine includes a rotatable crankshaft. The induction system broadly includes a blower including a rotatable impeller operable to compress induction fluid for the engine when rotated, and a drive assembly operable to drivingly connect the impeller to the crankshaft. The drive assembly includes a bracket, a bearing tube shiftably coupled to the bracket, a shaft rotatably supported in the tube, a pulley coupled to the shaft, and an endless element entraining the pulley for rotation therewith. The shaft is eccentrically positioned in the tube.

A third aspect of the present invention concerns an improved air induction system in a powered vehicle including an internal combustion engine wherein the engine includes a rotatable crankshaft and an intake manifold. The improved air induction system supplies compressed induction fluid to the intake manifold and broadly includes a blower including a rotatable impeller operable to compress induction fluid for the engine when rotated, and a drive assembly drivingly connecting the impeller to the crankshaft. The drive assembly includes a bracket, a bearing tube shiftably coupled to the bracket, a shaft rotatably supported in the tube, a pulley coupled to the shaft, and an endless element entraining the pulley for rotation therewith. The shaft is eccentrically positioned in the tube.

A fourth aspect of the present invention concerns a method of adjusting the tension in a belt broadly including the steps of entraining the belt around only two pulleys spaced apart a tension distance, coupling one of the pulleys to a shaft, rotatably supporting the shaft in an eccentric position relative to a bearing tube, and pivoting the bearing tube to thereby change the tension distance.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein.

DETAILED DESCRIPTION OF THE PREFERRED EMBODIMENTS

Figure 1:
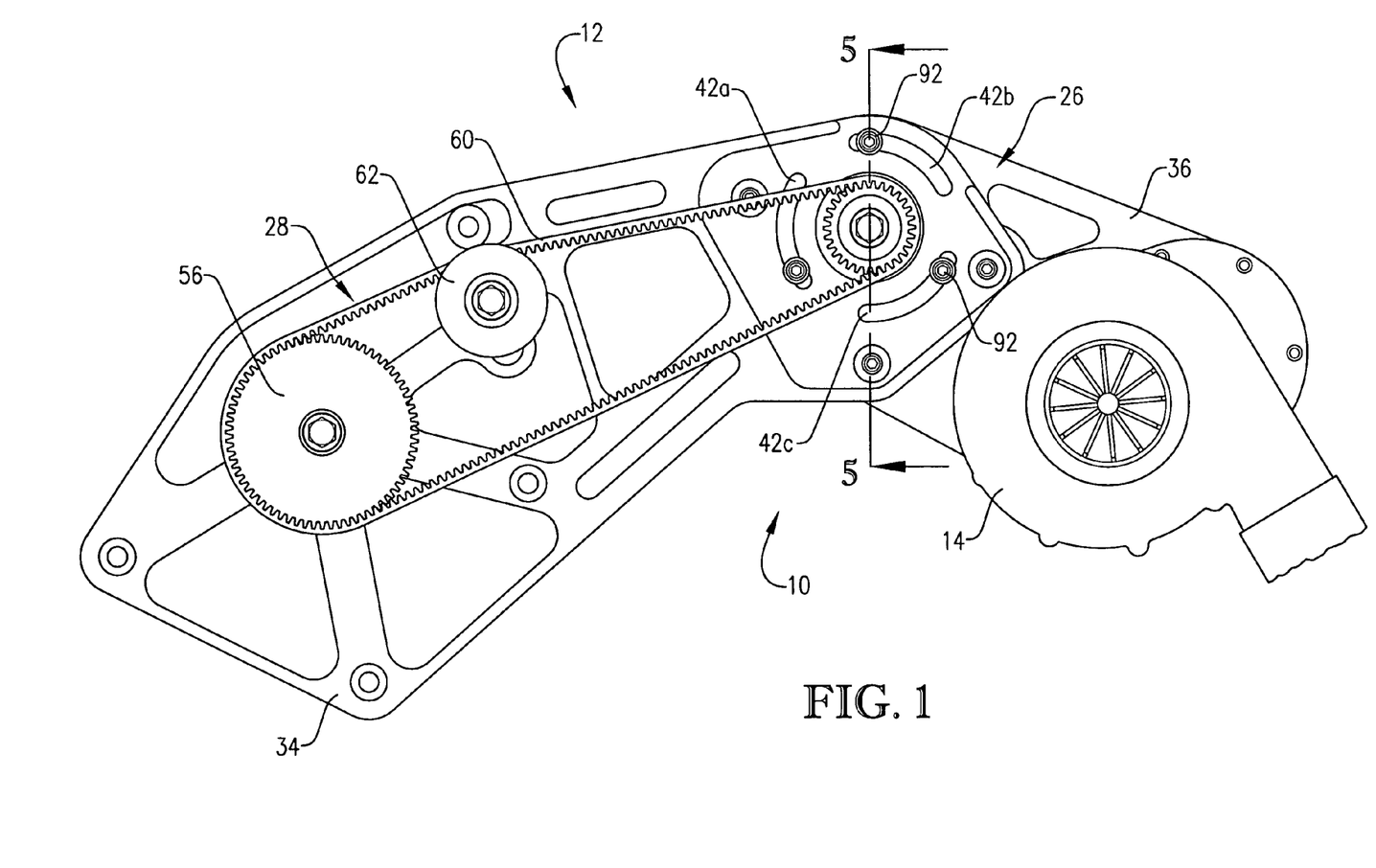
FIG. 1 is a fragmentary front elevational view of a powered vehicle having an air induction system including an improved drive assembly constructed in accordance with a preferred embodiment of the present invention including an intermediate eccentric pulley shaft.

FIG. 1 illustrates an air induction system 10 including an improved drive assembly 12 constructed in accordance with the principles of a preferred embodiment of the present invention and configured for transmitting power to a blower 14. The illustrated system 10 is driven off of a crankshaft 16 (see FIG. 3) of an internal combustion engine in a powered vehicle and is configured for supplying compressed induction fluid to the engine's intake manifold (not shown). While the principles of the present invention are particularly well suited for drive assemblies that transmit power from the crankshaft of an internal combustion engine to a blower, they could be similarly applied to virtually any system that utilizes rotatable components entrained by an endless element wherein it is desirable to adjust the tension in the endless element without the use of idler gears and/or pulleys.

Figures 3, 4:
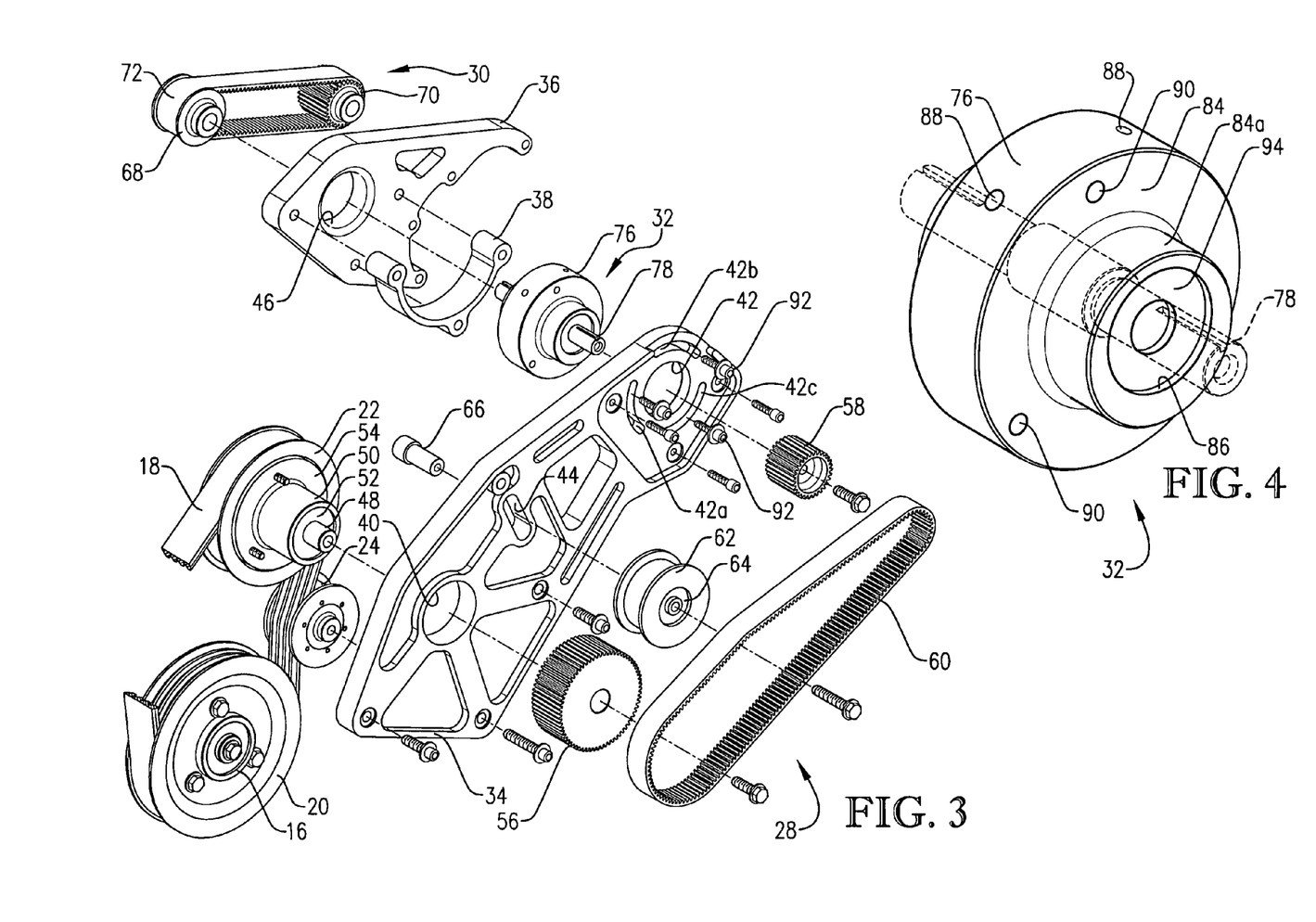
FIG. 3 is an exploded perspective assembly view of the drive assembly illustrated in FIGS. 1-2 shown with the internal combustion engine's serpentine belt (in fragmentary) entraining the crankshaft pulley of the powered vehicle and the primary drive pulley of the drive assembly.
FIG. 4 is an enlarged perspective view of the bearing tube of the drive assembly illustrated in FIGS. 1-3 showing the eccentric pulley shaft in phantom.

Turning initially to FIGS. 1 and 3, the illustrated drive assembly 12 transfers power from the engine's crankshaft 16 to the blower 14. Particularly, in one manner well known in the art, a serpentine belt 18 (see FIG. 3) entrains a crankshaft pulley 20 fixed to one end of the crankshaft 16 as well as a primary drive pulley 22 of the drive assembly 12 to rotatingly communicate power from the crankshaft 16 to the drive assembly 12. The serpentine belt 18 could entrain several other rotatable components, such as an idler pulley 24, or an alternator pulley (not shown), or a power steering pulley (not shown), or the like.

In one manner well known in the art, the illustrated blower 14 intakes air (and although not shown could include a filter), compresses the air, and delivers the compressed air to the engine's intake manifold (although not shown, an intercooler could be utilized). In more detail, the illustrated blower 14 is a centrifugal supercharger including a rotatable impeller housed in a volute case that compresses the air when rotated. In one manner known in the art, the impeller is rotated at significantly higher rpm than the crankshaft 16. In this regard, as further detailed below, the drive assembly 12 is preferably a step-up drive mechanism. However, the supercharger 14 preferably additionally includes a step-up transmission that facilitates the desired high rotational speeds of the impeller. Given the high operational speeds of the impeller and the attendant loads on the internal components of the supercharger 14 coupled with the undesirable impact of catastrophic failure of the supercharger 14, the supercharger 14 preferably includes an impeller shaft supported by a velocity variance-reducing multiple bearing arrangement and a dedicated lubrication system for lubricating the internal components of the supercharger 14. Suitable preferred multiple bearing arrangements are disclosed in applicant's U.S. Pat. No. 6,478,469, issued Nov. 12, 2002, entitled VELOCITY VARIANCE REDUCING MULTIPLE BEARING ARRANGEMENT FOR IMPELLER SHAFT OF CENTRIFUGAL SUPERCHARGER, as well as copending applications for U.S. patent Ser. Nos. 09/683,871 and 10/064,835, filed Feb. 26, 2002 and Aug. 22, 2002, respectively, both bearing the same title as the '469 patent, all of which are hereby incorporated by reference herein. Suitable preferred self-contained dedicated lubrication systems are disclosed in the copending U.S. application patent Ser. No. 10/641,619 entitled CENTRIFUGAL COMPRESSOR WITH IMPROVED LUBRICATION SYSTEM FOR GEAR-TYPE TRANSMISSION, filed Aug. 14, 2003, having a common assignee with the present application and hereby incorporated by reference herein. It is believed a supercharger having a multiple bearing arrangement and/or a self-contained, dedicated lubrication system reduces the risks of premature failure or in the event of such failure, reduces any attendant undesirable engine damage.

It is believed the supercharger designs disclosed in the above incorporated patents and applications combine to provide a supercharger capable of withstanding the operational loads inherent in powered vehicle applications, whether the vehicle be an automobile, a boat, a motorcycle, or the like. In particular, these supercharger designs provide superior long-lasting, durable superchargers that are unlikely to catastrophically fail and are therefore well suited for vehicle applications. However, it is within the ambit of the present invention to utilize various additional features and/or components for the centrifugal supercharger 14. For example, noise-reducing components and/or features such as a noise-reducing impeller shaft are disclosed in applicant's U.S. Pat. Nos. 6,478,016 and 6,516,788, issued Nov. 12, 2002 and Feb. 11, 2003, respectively, both entitled GEAR DRIVEN SUPERCHARGER HAVING NOISE REDUCING IMPELLER SHAFT, both of which are hereby incorporated by reference herein. Additionally, a soft material insert within the case is disclosed in applicant's copending application for U.S. patent Ser. No. 10/349,411, filed Jan. 22, 2003, entitled A METHOD AND APPARATUS FOR INCREASING THE ADIABATIC EFFICIENCY OF A CENTRIFUGAL SUPERCHARGER, which claims the priority of provisional U.S. application Ser. No. 60/430,814, filed Dec. 4, 2002 and bearing the same title, both of which are hereby incorporated by reference herein.

Although the above-described centrifugal supercharger is preferred, it is within the ambit of the present invention to utilize virtually any type of compressor for pressurizing induction fluid for the engine. For example, the air induction system 12 could utilize a Roots-type blower or the like. However, for some aspects of the present invention, it is important that the compressor be driven off of the drive train and not for example, a turbocharger that is driven off of the engine's exhaust.

As previously indicated, the illustrated drive assembly 12 transfers power from the engine's crankshaft 16 to the blower 14. Turning now to FIGS. 1-7, and perhaps as best shown in FIGS. 1 and 3, the illustrated drive assembly 12 broadly includes bracketry 26 for supporting the other components of the drive assembly 12, the primary drive pulley 22, a transfer drive subassembly 28 for transferring power from the pulley 22 downstream, a supercharger drive subassembly 30 for transferring power from the subassembly 28 to the supercharger 14, and an intermediate eccentric pulley shaft subassembly 32 adjustably inter-communicating the subassemblies 28 and 30.

In more detail, and turning to FIGS. 1 and 3, the bracketry 26 supports the supercharger 14 and the remaining components of the drive assembly 12 on the powered vehicle's engine block (not shown) and broadly includes a primary bracket 34, a blower bracket 36, and a spacer 38. Particularly, the primary bracket 34 is affixed to the powered vehicle's engine block, such as bolted thereto. Such a bolt on set up enables the air induction system 10 to be retrofitted onto the powered vehicle after market. However, the primary bracket 34 could also be integrally formed with the engine block, such as by an OEM during manufacture. The illustrated bracket 34 is generally flat presenting a narrow profile to enable the system 10 to fit in a relatively crowded engine compartment. For example, the illustrated bracket 34 is configured for placement on a 3.5 liter V-6 engine, such as the one found in the 2003 Nissan 350Z. However, the bracket 34 could be variously configured to accommodate virtually any automotive application. The primary bracket 34 is configured to support the primary drive pulley 22. In this regard, the primary bracket 34 includes a primary drive pulley-receiving aperture 40. The bracket 34 is further configured to at least partially support the intermediate eccentric pulley shaft subassembly 32. In this regard, formed in the end of the bracket 34 opposite the aperture 40 is bearing tube-receiving aperture 42. For purposes that will subsequently be described, the bracket 34 also includes a plurality of arcuate slots 42a, 42b, and 42c formed through the bracket 34 adjacent the aperture 42. As will be further detailed below, the transfer drive subassembly 28 is rotatably supported on shafts extending through the bracket 34. In this regard, the bracket 34 includes an elongated idler pulley-receiving slot 44.

Figure 2:
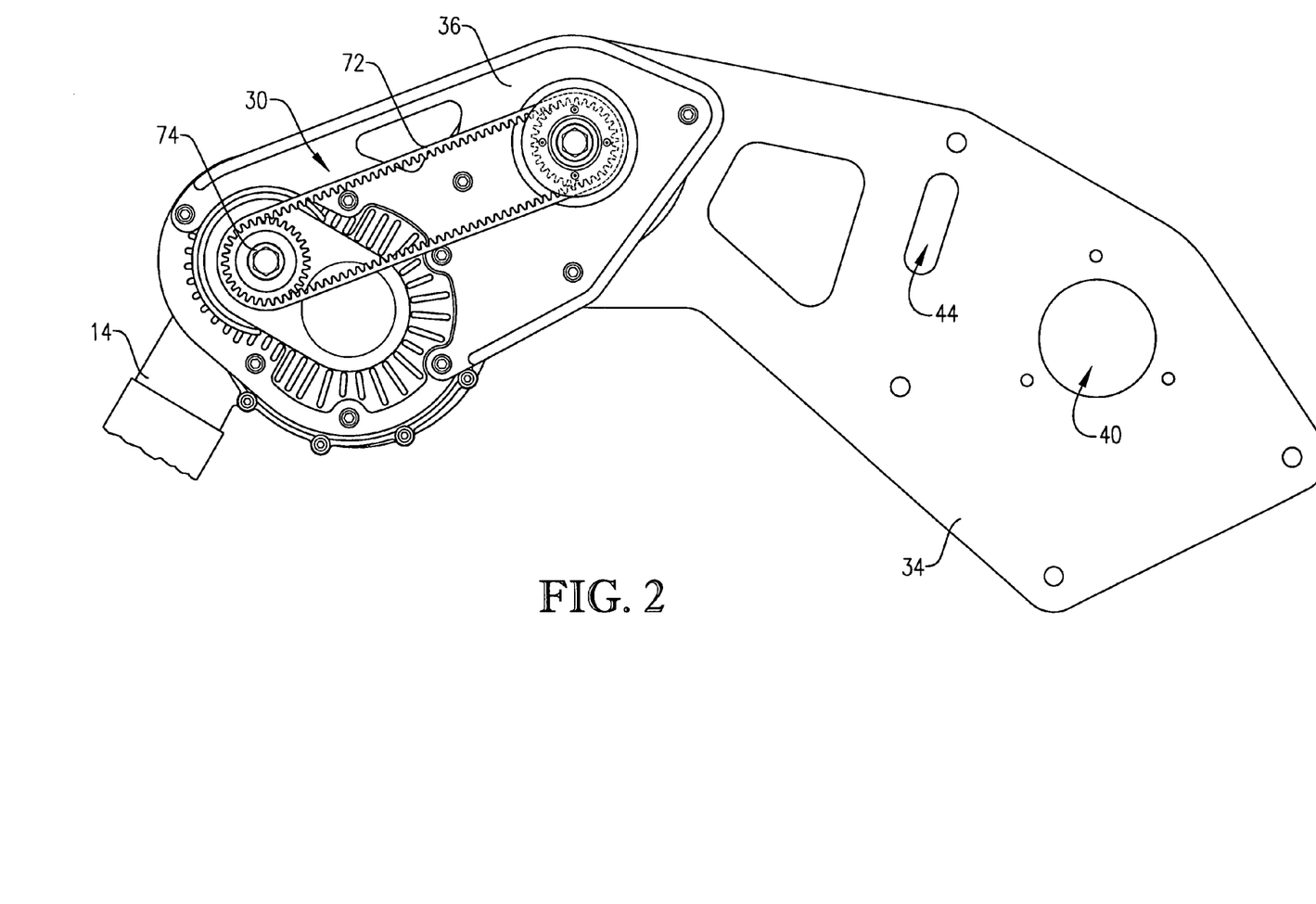
FIG. 2 is a fragmentary rear elevational view of the air induction system illustrated in FIG. 1 (with the primary drive pulley removed) showing the supercharger drive belt entraining the driven pulley of the centrifugal supercharger and the drive pulley carried on the eccentric pulley shaft without the use of any idler pulleys along the supercharger drive belt.

The blower bracket 36 is configured to cooperate with the primary bracket 34 to support the intermediate eccentric pulley shaft subassembly 32. In this regard, the bracket 36 includes a bearing tube-receiving aperture 46 formed there through. The aperture 46 is sized and dimension similar to the aperture 42 and the bracket 34 is configured to bolt on to the primary bracket 34 so that the apertures 42,46 generally axially align. As will be described in detail below, the eccentric pulley shaft subassembly 32 is shiftably supported on the brackets 34,36. In order to facilitate shifting of the subassembly 32, the spacer 38 is placed between the brackets 34,36 adjacent the aligned apertures 42,46. The spacer 38 is also configured to enable each of the brackets 34,36 to be bolted thereto so that the blower bracket 36 is supported on the primary bracket 34. The end of the blower bracket 36 opposite the aperture 46 is configured to supportably receive the blower 14. As shown in FIG. 2, the blower 14 is bolted to this end of the blower bracket 36.

It will be appreciated that given the high rotational speeds of the rotatable components of the air induction system 10 coupled with the desire for secure and tight tolerances of these components, the use of some bracketry 26 to house and support these components is preferred in blower applications. However, the bracketry 26 could be variously alternatively configured for any given application. Additionally, the use of supporting bracketry is not necessary for all applications, for example, the pulleys and/or gears utilized in the drive assembly could be rotatably supported directly on the driven components.

As indicated above, the primary drive pulley 22 is entrained by the serpentine belt 18 and thereby transfers power from the engine's crankshaft 16 to the drive assembly 12. In more detail, in one manner well known in the art, the primary drive pulley 22 is coupled to one end of rotatable pulley shaft 48. The pulley shaft 48 is rotatably supported in a housing 50 by a bearing 52. The pulley 22 is rotatably supported on the housing 50 by a larger bearing 54 that is fixed to the primary bracket 34, such as by bolting or the like. The housing 50 is received in the primary drive-receiving aperture 40. For reasons that will subsequently be described, the housing 50 is configured so that the rotatable pulley shaft 48 extends through the housing 50 and the bracket 34.

The transfer drive subassembly 28 transfers power from the primary drive pulley 22 downstream to the intermediate eccentric pulley shaft subassembly 32. In more detail, the transfer drive subassembly 28 includes a transfer drive pulley 56, a transfer driven pulley 58, a belt 60, and an idler pulley 62. Particularly, the transfer drive pulley 56 is fixed to the end of the pulley shaft 48 for rotation therewith, such as bolted thereto, keyed thereto, or the like. In one manner known in the art, the pulley 56 is a cogged pulley. The transfer driven pulley 58 is rotatably supported by the intermediate eccentric pulley shaft subassembly 32 (as will be subsequently described in detail). The driven pulley 58 is also a cogged pulley. However, as previously indicated, the drive assembly 12 is a step up drive and in this regard, the driven pulley 58 presents a smaller outer diameter than that of the drive pulley 56. The belt 60 is a cogged belt that entrains the transfer drive and driven pulleys 56,58. As will be described in detail below, the intermediate eccentric pulley shaft subassembly 32 communicates between the transfer and supercharger drive subassemblies 28,30 and is adjustable so as to eliminate the need for an idler pulley on one of the drive subassemblies 28,30. In the illustrated embodiment, it is preferred that the idler pulley be eliminated from the supercharge drive subassembly 30 given the step up nature of the drive assembly 12 and the relatively higher attendant speeds of the subassembly 30. In this regard, the idler pulley 62 is included on the transfer drive subassembly 28. The idler pulley 62 is rotatably supported by a bearing 64 that is carried by a shaft 66. The shaft 66 is received in the idler pulley-receiving slot 44 in the primary bracket 34. In one manner known in the art, the shaft 66 is adjustable relative to the slot 44, such as by unbolting the shaft 66 and shifting it along the slot 44. In this manner, the idler pulley 62 can be shifted to adjust the tension in the belt 60.

The supercharger drive subassembly 30 transfers power from the intermediate eccentric shaft subassembly 32 downstream to the supercharger 14. In more detail, the supercharger drive subassembly 30 includes a drive pulley 68, a driven pulley 70, and a belt 72. Particularly, the drive pulley 68 is rotatably supported by the intermediate eccentric pulley shaft subassembly 32 (as will be subsequently described in detail). The driven pulley 70 is fixed to one end of a supercharger transmission shaft 74 (see FIG. 2) for rotation therewith, such as bolted thereto, keyed thereto, or the like. Similar to the previously described transfer pulleys 56,58, the pulleys 68,70 are each cogged pulleys. The belt 72 is a cogged belt that entrains the drive and driven pulleys 68,70. As previously indicated and as will be described in detail below, the intermediate eccentric pulley shaft subassembly 32 communicates between the transfer and supercharger drive subassemblies 28,30 and is adjustable so as to eliminate the need for an idler pulley on one of the drive subassemblies 28,30. In the illustrated embodiment, it is preferred that the idler pulley be eliminated from the supercharge drive subassembly 30 given the step up nature of the drive assembly 12 and the relatively higher attendant speeds of the subassembly 30.

Figure 5:
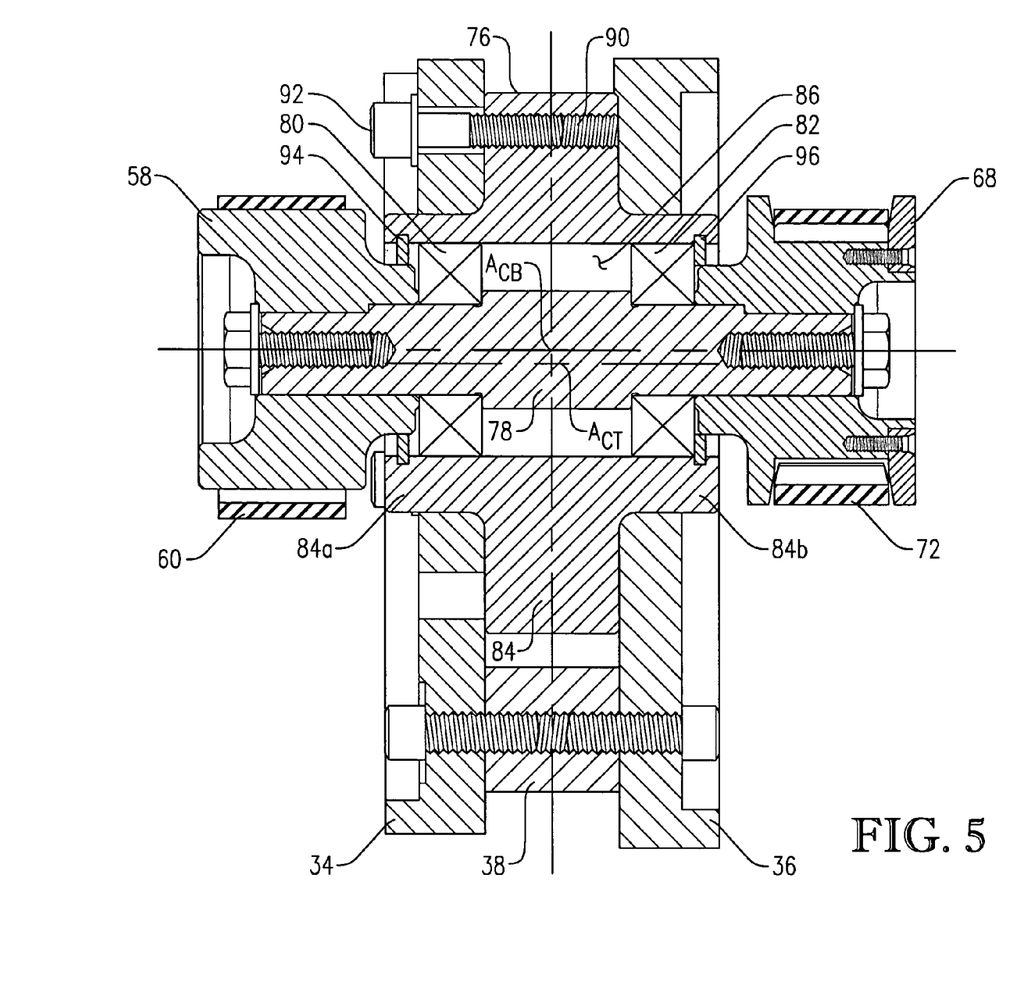
FIG. 5 is a sectional view of the air induction system taken generally along line 5-5 of FIG. 1.

Turning now to FIGS. 3-7, the intermediate eccentric pulley shaft subassembly 32 transfers power between the subassemblies 28 and 30 and is adjustable so as to eliminate the need for an idler pulley on at least one of the subassemblies 28,30. In more detail, the intermediate eccentric pulley shaft subassembly 32 includes a shiftable bearing tube 76, and an intermediate eccentric pulley shaft 78 rotatably supported in the bearing tube 76 by a pair of bearings 80 and 82. Particularly, the bearing tube 76 includes a generally cylindrical body 84 presenting a generally cylindrical configuration. The body 84 includes a pair of axially opposed embossed extension sections 84a and 84b. The sections 84a,84b are each configured to be received within the corresponding bearing tube-receiving apertures 42 and 46, respectively, formed in the bracketry 26. The extension sections 84a,84b are generally concentrically located along the tube body 84. That is to say, and as shown in FIG. 5, the extension sections 84a,84b are generally axially aligned with the cylindrical body 84 of the bearing tube 76 so as to define a common central tube axis, designated as $A_{CT}$ in FIGS. 5-7, extending longitudinally through the center of the bearing tube 76.

The illustrated bearing tube 76 further includes an internal bore 86 extending through the sections 84a,84b and the body 84. The internal bore 86 is configured to receive the bearings 80,82 for rotatably supporting the pulley shaft 78 within the bore 86. For purposes that will subsequently be described in detail, in the illustrated bearing tube 76, the internal bore 86 is generally eccentrically positioned within the tube body 84 and the extension sections 84a,84b. That is to say, and as shown in FIG. 5, the internal bore 86 generally defines a central bore axis, designated as $A_{CB}$ in FIGS. 5-7, extending longitudinally through the internal bore 86 that is generally parallel with, but laterally spaced from, the central tube axis $A_{CT}$.

As previously indicated, and for purposes that will subsequently be described, the tube body 84 is configured to be selectively shifted relative to the brackets 34,36,38. In this regard, the body 84 includes a plurality of holes 88 spaced around the body's outer circumferential surface (see FIG. 4). The holes 88 are configured to receive any suitable pry bar, such as screw driver, an elongated bolt, or the like, to facilitate shifting of the body 84 relative to the bracketry 26. It will be appreciated that when the body 84 is shifted, the generally circular extension sections 84a,84b pivot or rotate within the respective apertures 42,46. In this manner, the central tube axis $A_{CT}$ remains in a fixed location relative to the apertures 42,46. The tube body 84 can be selectively shifted by the user and is configured to be locked into a variety of desired positions (as will be detailed below). In this regard, the body 84 includes a plurality of internally threaded fastener-receiving apertures 90 spaced around the front face of the body 84 (see FIG. 4). The apertures 90 receive corresponding threaded fasteners 92, such as bolts or the like (see FIGS. 3 and 5-7). The fasteners 92 extend through the respective arcuate slots 42a-c. When the fasteners 92 are sufficiently loosened, the fasteners 92 shift (with the body 84) in the slots 42a-c (see FIGS. 6 and 7). When the desired position of the body 84 is achieved, the fasteners 92 can be sufficiently tightened against the bracket 34 to prevent further shifting of the body 84.

The eccentric pulley shaft 78 is received within the internal bore 86 of the bearing tube 76 and is rotatably supported therein by the bearings 80,82. To facilitate placement and/or pre-loading of the bearings 80,82, the bearing tube 76 includes a pair of washers 94 and 96 notched into the body 84 at either end of the internal bore 86 (see FIG. 5). To facilitate placement and/or support of the shaft 78, the shaft 78 is embossed between the bearings 80,82. The shaft 78 extends through the internal bore 86 and projects out of both ends thereof. The transfer driven pulley 58 is fixed to the transfer end of the shaft 78. As shown in FIG. 5, to secure the transfer driven pulley 58 to the shaft 78, the pulley 58 is both keyed to the shaft 78 and bolted thereto. The drive pulley 68 of the supercharger drive subassembly 30 is fixed to the supercharger end of the shaft 78 and in a manner similar to the transfer pulley 58 is both keyed to the shaft 78 and bolted thereto.

Figure 6:
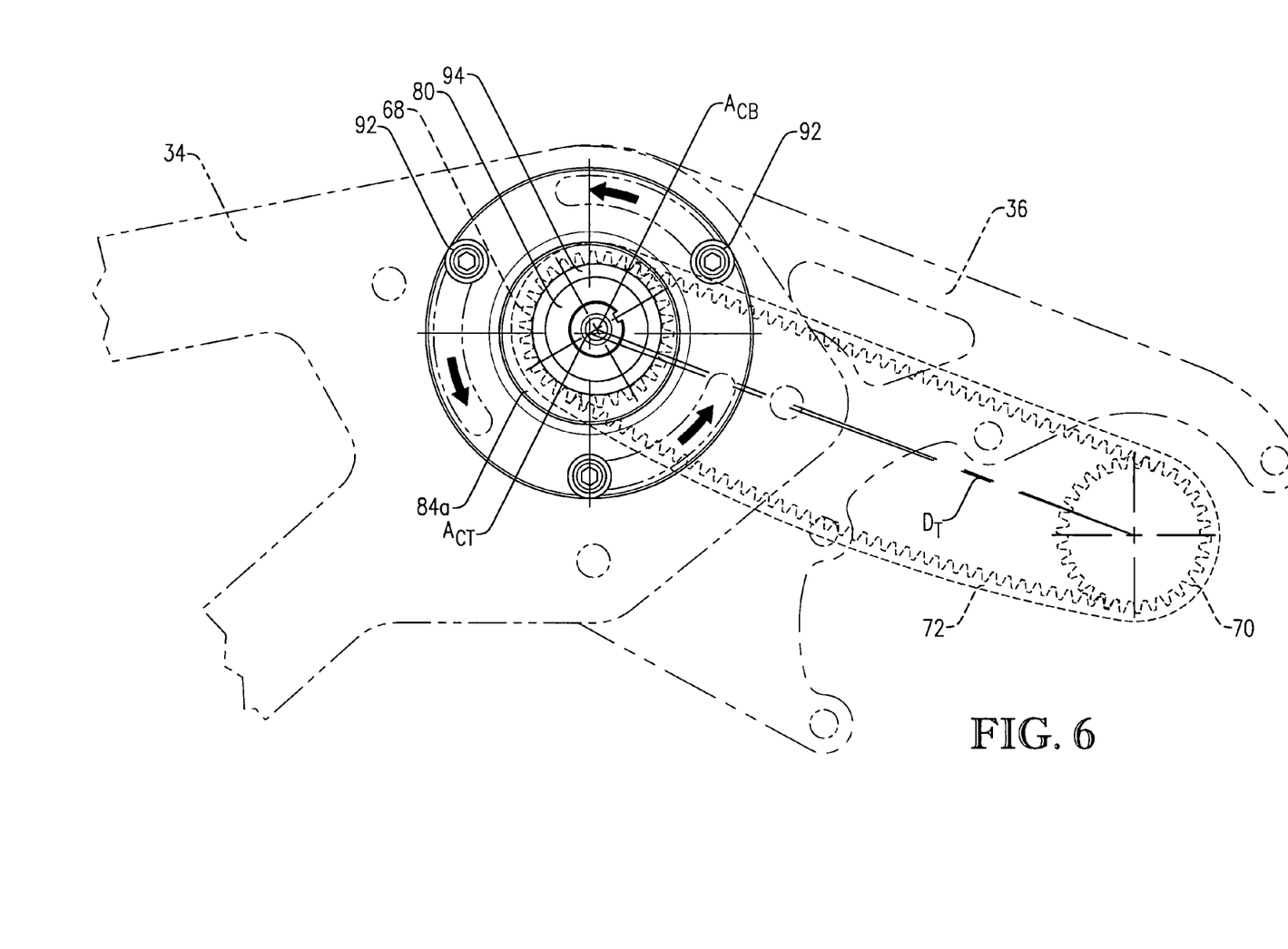
FIG. 6 is a fragmentary rear elevational view of the drive assembly illustrated in FIGS. 1-5 showing the eccentric pulley shaft in a slackened position with the supercharger drive belt (in phantom) in a loose configuration.
Figure 7:
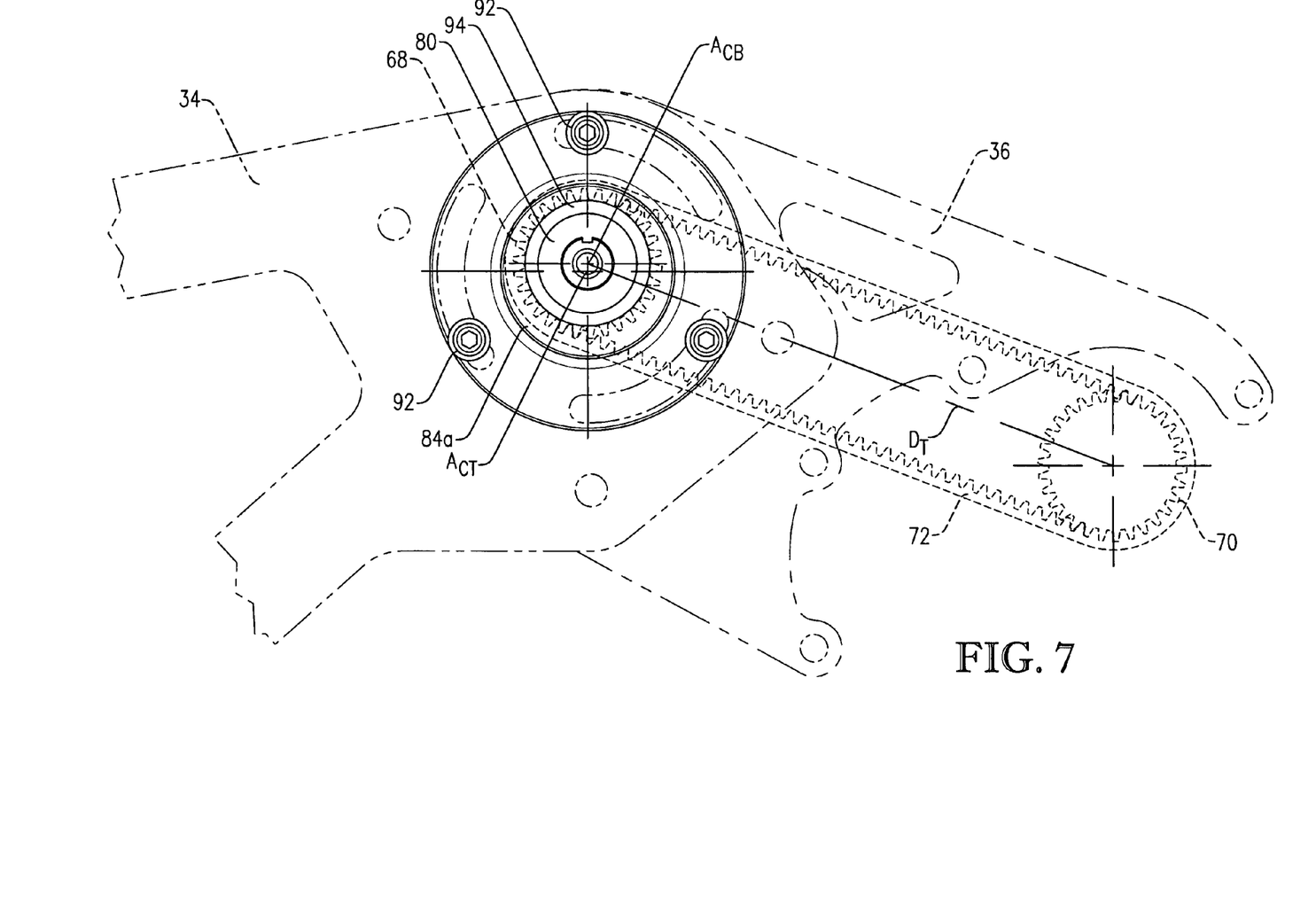
FIG. 7 is a fragmentary rear elevational view of the drive assembly similar to FIG. 6 showing the eccentric pulley shaft in a tightened position with the supercharger drive belt (in phantom) in a taught configuration.

As previously indicated, the intermediate eccentric pulley shaft subassembly 32 is configured to enable selective and adjustable tensioning of the supercharger drive belt 72 without the need for an idler pulley entrained by the belt 72. In this regard, the pulley shaft 78 is eccentrically positioned within the bearing tube 76. The illustrated eccentric pulley shaft 78 is generally centered within the eccentric internal bore 86. That is to say, the pulley shaft 78 and the internal bore 86 share the common central longitudinal axis $A_{CB}$ so as to be generally coaxially aligned with each other. In this manner, when the bearing tube 76 is shifted relative to the bracketry 26, the eccentric positioning of the pulley shaft 78 with the tube 76 causes the axis $A_{CB}$ to move laterally relative to the bracketry 26. That is to say, the supercharger drive and driven pulleys 68,70 each define an axial center that are spaced a tension distance—designated as $D_T$ in FIGS. 6 and 7—that can be varied by pivoting, or rotating the bearing tube 76 relative to the brackets 34,36. The illustrated bearing tube 76 is shiftable between a slackened position, as shown in FIG. 6, wherein the axes $A_{CT}$ and $A_{CB}$ are laterally spaced from one another and a tightened position, as shown in FIG. 7, wherein the axes $A_{CT}$ and $A_{CB}$ are generally laterally, or horizontally, aligned with each other. The slackened position corresponds with the tension distance $D_T$ being relatively shorter and thus the belt 72 being in a loosened configuration. The tightened position corresponds with the tension distance $D_T$ being relatively longer and thus the belt being in a taught configuration. It will be appreciated that the fasteners 92 are simply loosened to allow shifting between the positions and tightened to maintain the bearing tube 76 in the desired position. It will further be appreciated that the bearing tube 76 could be shifted to virtually any position between the slackened and tightened positions to set the proper tension in the belt 72.

It will be appreciated that the intermediate eccentric pulley shaft subassembly 32 enables the drive assembly 12 to eliminate the need any idler pulley(s) on the supercharger drive belt 72. Such a configuration is advantageous because it eliminates the undesirable increased friction and/or drag on the belt occasioned by the idler pulley. Additionally, it increases the belt life by eliminating "backbending" of the belt in a triangular configuration occasioned by an idler pulley. Furthermore, such a configuration reduces undesirable slippage of the belt with the requisite triangular setup when using an idler pulley. Moreover, such a configuration is less part and labor intensive, therefore enabling a more cost-effective drive assembly that is easier to maintain. Such a setup is particularly well suited for the illustrated air induction system 10 given relatively high impeller speeds inherent in a supercharger. However, the principles of the present invention are not limited to supercharger applications, nor are they limited to automotive applications. It is also within the ambit of the present invention to utilize various alternative configurations for the drive assembly and/or the eccentric pulley shaft. For example, in the illustrated embodiment, while it is important that at least one of the tube, bore, and shaft axes be non-coaxial, the tube and bore axes could be coaxially aligned and the shaft axes could be non-coaxial therewith, such as with the use of an eccentric bearing, or the like. Additionally, the eccentric pulley shaft need not be used as an intermediate pulley shaft, but could readily be used in a single belt system or with gears and a chain.

In operation, the primary bracket 34 is first bolted to the engine block. The primary drive pulley 22 is then fixed to the shaft 48 and the shaft 48 and the housing 50 are inserted through the aperture 40. Next, the transfer drive pulley 56 is bolted to the other end of the shaft 48. The serpentine belt 18 can then be entrained around the drive pulley 22 and the idler pulley 24 and tensioned to specification. Next, intermediate eccentric pulley shaft subassembly 32 can be positioned through the apertures 42,46 and the bracket 36 and the spacer 38 can be bolted into place. The supercharger 14 can next be bolted to the end of the bracket 36. The transfer driven pulley 58 and the supercharger drive pulley 68 can then be keyed and bolted onto the intermediate eccentric pulley shaft 78. The transfer belt 60 can then be entrained around the pulleys 56,58,62. The supercharger driven pulley 70 can then be bolted to the supercharger transmission shaft 74 and the supercharger drive belt 72 can be entrained around the pulleys 68,70. The bearing tube 76 can then be shifted into the desired position to set the proper tension in the belt 72 and the fasteners 92 can then be tightened to hold the position. Because the eccentric shaft 78 is an intermediate shaft, once the tension has been set in the belt 72, the idler pulley 62 can then be adjusted to set the tension in the transfer belt 60. The air induction system 10 is now ready for operation. When the engine is started the crankshaft 16 rotates power up the drive assembly 12. The drive assembly 12 in turn transfers stepped-up power to the supercharger 14. The supercharger 14 intakes air, compresses it, and delivers it to the intake manifold of the engine.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. An air induction system for supplying compressed induction fluid to an intake manifold of an internal combustion engine wherein the engine includes a rotatable crankshaft, said induction system comprising:
    a blower including a rotatable impeller operable to compress induction fluid for the engine when rotated; and
    a drive assembly operable to drivingly connect the impeller to the crankshaft,
    said drive assembly including a bracket, a bearing tube shiftably coupled to said bracket, a shaft rotatably supported in said tube, a pulley coupled to said shaft, and an endless element entraining said pulley for rotation therewith,
    said shaft being eccentrically positioned in said tube,
    said bearing tube including a generally cylindrical body and an internal bore extending axially through said body,
    said bore being eccentrically positioned relative to said body,
    said bracket including a tube-receiving aperture formed therethrough and at least one elongated slot positioned adjacent said aperture,
    said bore and shaft extending through said aperture,
    said slot being arcuate,
    said drive assembly further including a fastener coupled to said body and extending through said slot,
    said body and fastener shiftable relative to said bracket between at least two differing positions wherein said bore rotates relative to said bracket when said body is shifted between said positions,
    said fastener being adjustably coupled to said body and operable to selectively prevent said body from shifting out of a respective one of said positions.

2. The induction system as claimed in claim 1,
    said drive assembly including an additional pulley entrained by said endless element,
    said first-mentioned and said additional pulleys being the only components entrained by and engaged by said endless element.

3. The induction system as claimed in claim 2,
    said additional pulley being coupled to an additional shaft that extends into said blower.

4. The induction system as claimed in claim 3,
    said drive assembly including a second additional pulley coupled to said shaft at the opposite end of said first-mentioned pulley, a third additional pulley adapted to couple to the crankshaft, and an additional endless element entraining the second and third additional pulleys,
    said drive assembly further including an idler pulley entrained by said additional endless element.

5. The induction system as claimed in claim 2,
    said pulleys each defining an axial center and being spaced a tension distance defined between said centers.

6. The induction system as claimed in claim 5,
    said tube being shiftable relative to said bracket between first and second positions wherein said tension distance is different in each position.

7. The induction system as claimed in claim 1,
    said endless element comprising a belt.

8. The induction system as claimed in claim 1,
    said blower comprising a centrifugal supercharger.

9. The induction system as claimed in claim 1,
    said shaft extending through said bore,
    said drive assembly further including a bearing received in said bore and positioned between said body and shaft.

10. In a powered vehicle including an internal combustion engine wherein the engine includes a rotatable crankshaft and an intake manifold, an improved air induction system for supplying compressed induction fluid to the intake manifold, said induction system comprising:
    a blower including a rotatable impeller operable to compress induction fluid for the engine when rotated; and
    a drive assembly drivingly connecting the impeller to the crankshaft,
    said drive assembly including a bracket, a bearing tube shiftably coupled to said bracket, a shaft rotatable supported in said tube, a pulley coupled to said shaft, and an endless element entraining said pulley for rotation therewith,
    said shaft being eccentrically positioned in said tube,
    said bearing tube including a generally cylindrical body and an internal bore extending axially through said body,
    said bore being eccentrically positioned relative to said body,
    said bracket including a tube-receiving aperture formed therethrough and at least one elongated slot positioned adjacent said aperture,
    said bore and shaft extending through said aperture,
    said drive assembly further including a fastener coupled to said body and extending through said slot, said body and fastener shiftable relative to said bracket between at least two differing positions wherein said bore rotates relative to said bracket when said body is shifted between said positions, said fastener being adjustably coupled to said body and operable to selectively prevent said body from shifting out of a respective one of said positions.

11. In the powered vehicle as claimed in claim 10, said drive assembly including an additional pulley entrained by said endless element, said first-mentioned and said additional pulleys being the only components entrained by and engaged by said endless element.

12. In the powered vehicle as claimed in claim 11, said additional pulley being coupled to an additional shaft that extends into said blower.

13. In the powered vehicle as claimed in claim 11, said pulleys each defining an axial center and being spaced a tension distance defined between said centers.

14. In the powered vehicle as claimed in claim 13, said tube being shiftable relative to said bracket between first and second positions wherein said tension distance is different in each position.

15. In the powered vehicle as claimed in claim 10, said endless element comprising a belt.

16. In the powered vehicle as claimed in claim 10, said blower comprising a centrifugal supercharger.

17. In the powered vehicle as claimed in claim 10, said shaft extending through said bore, said drive assembly further including a bearing received in said bore and positioned between said body and shaft.

* * * * *